(12) United States Patent
Hayes

(10) Patent No.: US 6,908,528 B2
(45) Date of Patent: Jun. 21, 2005

(54) LAMINATE COMPOSITE FABRIC

(75) Inventor: James F. Hayes, Forest City, NC (US)

(73) Assignee: Reeves Brothers, Inc., Spartanburg, SC (US)

( * ) Notice: Subject to any disclaimer, the term of this patent is extended or adjusted under 35 U.S.C. 154(b) by 228 days.

(21) Appl. No.: 09/919,803

(22) Filed: Aug. 2, 2001

(65) Prior Publication Data

US 2003/0027474 A1 Feb. 6, 2003

(51) Int. Cl.$^7$ .................. B32B 31/22; B32B 27/04; B32B 27/12; C09J 5/02; B05D 3/10
(52) U.S. Cl. ................ 156/307.1; 156/307.3; 156/331.1; 156/331.7; 427/301; 442/149
(58) Field of Search .................. 156/289, 307.1, 156/308.6, 310, 331.1, 331.7, 307.3; 427/301, 302, 303, 304, 305, 306; 442/149, 150, 151

(56) References Cited

U.S. PATENT DOCUMENTS 3,775,205 A * 11/1973 Hermann et al. ............. 156/72
3,936,542 A * 2/1976 Cox ............................ 427/288
5,399,402 A * 3/1995 Inoue et al. ................ 428/35.7

* cited by examiner

Primary Examiner—J. A. Lorengo
(74) Attorney, Agent, or Firm—Dougherty, Clements, Hofer & Bernard

(57) ABSTRACT

A laminated composite fabric material used for example in the manufacture of automobile air bags has at least one thermoplastic coating layer that is pressure laminated to a pre-treated fabric using an adhesive. The fabric, pre-treated with a curing agent such as an alkyl ether amine, resists penetration by the adhesive, resulting in a softer, more pliable composite fabric. The composite fabric also optionally includes a layer comprising a silicone polyurethane copolymer or acrylic cross-linked with a blocked isocyanate, which functions as a non-stick coating. The invention also relates to a method for manufacturing a laminated composite fabric.

5 Claims, 2 Drawing Sheets

LAMINATE COMPOSITE FABRIC

FIELD OF THE INVENTION

The present invention relates to a laminated composite fabric material. More specifically, the present invention relates to a composite fabric material having at least one coating layer that is bound to a fabric substrate by an adhesive. The invention also relates to a method for manufacturing a laminated composite fabric. The fabric is preferably used in the manufacture of automobile air bags.

BACKGROUND OF THE INVENTION

Polyurethane coated fabrics are used in a wide array of products and applications, including high performance applications such as fuel cell fabrication for aviation fuel containment, and as automobile passive restraint systems, specifically air bags.

The air bag is preferably assembled from a urethane coated fabric that can be heat sealed. The fabric is a laminated product. The fabric is dipped in a urethane adhesive and then the urethane film laminate is placed on the adhesive. This produces a low cost, lightweight coated fabric that can be fabricated by methods including heat bonding and dielectrical welding, into an automotive restraint device that will remain inflated to protect the vehicle occupants form injury during a side impact of rollover accident.

High performance polyurethane elastomers include, for example, polytetramethylene glycol (polyether) polyurethanes and poly(butane adipates or hexane adipates) ester polyurethanes. The polyether polyurethanes exhibit good hydrolytic stability and good low temperature properties but offer typically poor oxidation resistance. The polyester polyurethanes, on the other hand, exhibit good toughness, abrasion resistance, and oxidation resistance, but are less resistant to hydrolysis. Polyurethanes based on polycarbonate polyols are known to have good hydrolytic stability and generally have good resistance to other degradation forces; however, these polyurethanes are typically too hard, rigid and brittle for use in industrial fabrics.

High performance coated fabrics are based primarily on the polyester polyurethanes, based on their overall performance, despite their relatively poor hydrolytic stability.

U.S. Pat. No. 5,298,303 is directed to a coated fabric for use as an automobile air bag that can accommodate rapid inflation and maintain an internal pressure for a period of time. The fabric comprises a fibrous skeleton that is coated with a plurality of layers wherein at least one of the coating layers comprises a polycarbonate-polyether polyurethane formed from a polyol. A second layer comprises a second polymer such as polyurethane or an elastomer. At least a portion of the structure may include, as an initial layer, an adhesion aid to assist in the bonding of the coating layers. The adhesion aid is preferentially an aziridine compound.

U.S. Pat. No. 5,302,432, directed to an automobile air bag, discloses a fabric comprising a woven synthetic fiber, a film of a polyolefin group resin laminated on a side of the woven fiber, and a non-woven fabric laminated on the film. Preferably, the woven fabric is manufactured by weaving a multi-filament of a polyamide group or a multi-filament of a polyester group. A polyamide fiber, a polyester fiber, or a regenerated cellulose fiber can be used for the non-woven fabric. During manufacture, both the woven and non-woven fabrics are closely bonded to a molten portion of the resin film, which solidifies upon cooling to form a low air permeability composite fabric.

U.S. Pat. No. 5,407,728 is directed to a fabric containing a graft polymer to be used for an air bag substrate capable of maintaining the integrity of the sewn seams during packaging, compaction, and inflation. The method of making the fabric involves contacting fibers and yarns with a grafting solution at any stage of production. Thus, the grafting solution may be applied to filament fibers, yarns, or formed fabric either before or after chemical or mechanical production operations such as spin finishing, application of lubricants, or sizing. The grafted air bag fabric has a reduced fabric porosity and increased structural integrity. The method utilizes a grafting solution containing water, a catalyst for activating or regenerating a graft initiator in the presence of the fibers or yarns, a graft initiator, and at least one component, such as a water dispersible polyurethane polymer, having a functional group that reacts with and bonds to the fibers or yarns. The grafting solution may also contain second component, such as a monomer, that covalently bonds to the first component or bonds directly to the fibers or yarns. The method includes the general sequence of radical formation; initiation and extension, where the free radical reacts with the first or second components; propagation; and termination.

U.S. Pat. No. 6,183,009 relates to a multilayered textile composite material for use in an inflatable gas bag that comprises at least one layer of a textile material and one layer of a polymer material whose melting range is lower that the melting range of the textile material. The textile composite material is formed into a specified three-dimensional shape which is to develop during inflation of the gas bag, and the individual layers of the textile composite material are joined together in this three-dimensional shape so as to avoid the formation of creases in the inflated state.

In the manufacture of fabrics for use in automobile air bags, for example, the fabric must be low cost, light weight, and fire retardant. Furthermore, the fabric must be both of sufficient strength to resist instant expansion and possess the ability to be folded compactly.

A method of adhering a preformed elastomer film to a fabric material by using an adhesive is known. This method is generally unsuited to the manufacture of composite fabrics for use in automobile air bags, however, because the adhesive percolates between filaments in the fabric producing a laminated cloth that is undesirably hard and stiff. Furthermore, the conventional method produces a fabric with imbedded adhesive and thus yields a flammable laminated cloth, which is incompatible with federal motor vehicle safety standards.

Accordingly, there is a need for a composite fabric suitable for use in an automobile airbag comprising a thermoplastic film laminated via an adhesive to a fabric core and a method for making the same.

SUMMARY OF THE INVENTION

The present invention relates to a coated fabric that is a composite of a fabric substrate and a coating that has been pressure-laminated to the fabric and adheres thereon thereupon. The coating comprises a plurality of layers wherein at least one of the layers includes a thermoplastic, at least one layer an adhesive is applied to the fabric, and at least one coating is a curing or thickening agent applied to the fabric prior to pressure-laminating the coating to the layer.

In a preferred embodiment, the curing or thickening agent is applied to the fabric as a fluid or paste, and at least some of the solvent or carrier, and in a preferred embobiment substantially all of the solvent or carrier, is removed by pressing and/or by evaporation prior to applying the adhesive to the fabric.

In another preferred embodiment, the curing agent comprises an amine. In a more preferred embodiment, the curing agent comprises a primary or secondary amine. The amine can to add to the carbonyl carbon of aldehydes (and ketones) to form amides; can add to epoxies to form aminoalcohols; can add to carboxylic acids to form amides, can add to isocyanates to form ureas; can add to acids to form stable salts; can add to acrylonitrile to form cyanoethylated amines; can add to urea to form substituted ureas; and the like.

In one embodiment, the curing agent comprises a primary or secondary alkyl amine, preferably a primary alkyl diamine or alkyl tri-amine. In another embodiment, the curing agent comprises a primary or secondary ether amine or alkyl ether amine. In a more preferred embodiment, the curing agent comprises a polyetheramine, for example a poly(oxypropylene)amine.

In a preferred embodiment, the curing agent comprises a primary or secondary amine, preferably a primary amine, disposed on a secondary carbon. The amine is thereby sterically hindered, slowing any curing reaction.

In another preferred embodiment, the curing agent comprises an average of 1.5 or more amine functional moieties per molecule of curing agent. I a more preferred embodiment, the curing agent comprised an average of 2 amine moieties per molecule of curing agent. In an even more preferred embodiment, the curing agent comprises at least 2.5 amine functional moieties, for example three functional amine moieties, per molecule of curing agent.

A preferred curing agent comprises a poly(oxypropylene) di- or tri-amine. Having at least a portion of the curing agent comprise a tri-amine provides a thermosetting fixative. While the curing agent may react with the adhesive prior to pressure-laminating the thermoplastic to the fabric, it is preferred that at least a portion of the curing agent react with at least a portion of the adhesive during the pressure lamination step. A preferred molecular weight is between about 100 and about 4000, for example between about 150 and about 1000, say between about 200 and about 500. Such a compound would have between about 3 and about 10 poly(oxypropylene) moieties.

A preferred curing compound is a poly(alkyl-ether) diamine, a poly(alkyl-ether)triamine, or a mixture thereof, where the carbon atoms binding to the nitrogen are separated by at least one alkyl-ether segment.

The thermoplastic layer is pressure laminated to the adhesive. Without being bound to theory, it is believed the curing agent promotes adhesive curing and beneficially also promotes adhesion to the fabric. The reaction takes place at a time and rate sufficient to result in substantial curing of the adhesive contacting the fabric, thereby limiting adhesive penetration during the adhesive during pressure lamination.

According to a preferred embodiment, the coated fabric includes a layer comprising a silicone-containing polymer that is bondable to the adhesive, the fabric, and/or the thermoplastic layer. In a preferred embodiment the silicone-containing polymer comprises a polyurethane copolymer, an acrylic polymer, or a mixture thereof, each cross-linked with a blocked isocyanate. In one embodiment, the silicone-containing polymer is crosslinkable with functional moieties in the adhesive or on the fabric.

DETAILED DESCRIPTION OF THE PREFERRED EMBODIMENT

Figure 1:
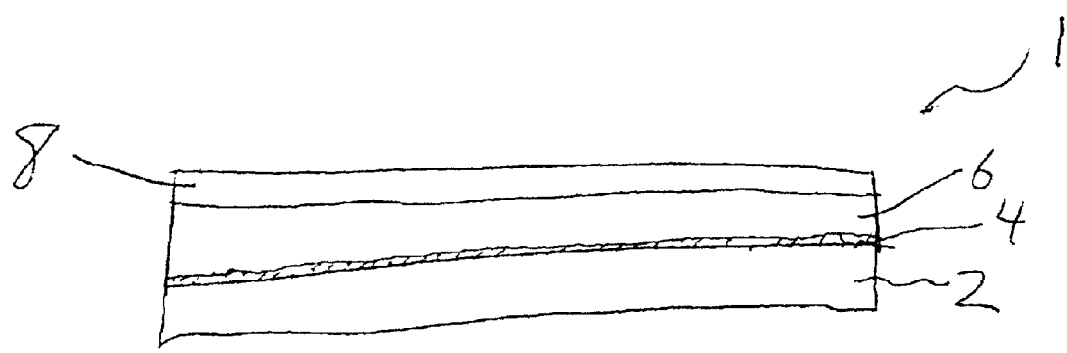
FIG. 1 shows a cross-sectional view of the composite fabric of the invention.

One embodiment of the present invention is directed to a low cost, lightweight coated composite fabric which can be manufactured (woven, glued, sewn, heat bonded, dielectrically welded, etc.) into an automotive restraint device, such a front or side airbag.

The composite fabric of the invention exhibits increased durability and ease of manufacture. For example, it is flexible, tough, flame resistant, tear resistant, and displays good shape retention. The present invention relates further to a high performance composite fabric structure consisting of a plurality of layers including a first layer comprising a woven or non-woven fabric made from natural or synthetic fibers, a second layer comprising an adhesive, and a third layer comprising a laminated thermoplastic.

According to a further embodiment, the coated composite fabric of the invention comprises a fabric substrate, an adhesive, and a thermoplastic or thermoset layer pressure-laminated thereon, wherein the adhesive is at least partially cross linked prior to pressure laminating so the adhesive penetration into the fiber is reduced.

A further embodiment of the invention describes a process for manufacturing a coated fibrous fabric comprising the steps of: coating a fabric with a compound that increases viscosity of an adhesive; applying an adhesive to the coated fabric; and pressure laminating a thermoplastic layer to the adhesive-coated fabric, wherein the compound reduces penetration of the adhesive into the fabric compared with a coated fabric manufactured without the compound. The compound preferably adheres to the fibers and thereby substantially prevents the adhesive from physically entering the fabric. In a preferred embodiment, the compound increases the viscosity of the adhesive thereby substantially preventing the adhesive from entering the fabric. In a still further embodiment, the compound is a cross linking agent, which cross links the adhesive and substantially prevents the adhesive from entering the fabric.

The coated fabric of the present invention is a soft, non-saturated laminate composite. In one preferred embodiment, the composite comprises a film laminated to an adhesive-coated amine-pre-treated fabric. According to a second preferred embodiment, the composite further comprises an optional silicone polyurethane film.

The term 'fabric' as used herein refers to a base substrate of fiber, whether woven, non-woven, knitted or braided, made from natural and/or synthetic fibers, and upon which various polymers are applied by coating, dipping, laminating, or by other suitable means. The terms fiber, yarn, filament, staple and fabric are well known to those skilled in the textile art.

This invention is applicable to any suitable fabric material, including acetate, polyester, polypropylene fabric, nylon, fiberglass, acrylic, cellulose, polyethylene, polyvinyl chloride, polycarbonate, polyurethane, polyester polyurethane, and the like. The invention is particularly applicable to polyester polyurethanes, based on their overall performance, despite their relatively poor hydrolytic stability. Polyester fibers or blends thereof are also preferred.

The fabric is pretreated with a pretreatment compound that comprises a curing agent. In a preferred embodiment the curing agent comprises an amine, for example a primary or a secondary amine. Primary amines are preferred. The amine, particularly a primary amine, can add to the carbonyl carbon of aldehydes (and ketones) to form imines; can add to epoxies to form aminoalcohols; can add to carboxylic acids to form amides, can add to isocyanates to form ureas; can add to acids to form stable salts; can add to acrylonitrile to form cyanoethylated amines; can add to urea to form substituted ureas; and the like. Such activity makes the amine particularly suited for use as a curing or thickening agent for a variety of adhesives.

In one embodiment, the curing agent comprises a primary or secondary alkyl amine. In another embodiment, the curing agent comprises a primary or secondary ether mono-, di-, or tri-amine or alkyl ether mono-, di-, or tri-amine. In a more preferred embodiment, the curing agent comprises a poly(ether)amine, for example a poly(oxypropylene) mono-, di-, or tri-amine.

In a preferred embodiment, the curing agent comprises a plurality of primary or secondary amine moieties, preferably between 2 and 3 primary amine moieties per molecule, each disposed on a secondary carbon. The amine is thereby sterically hindered, slowing any curing reaction.

In another preferred embodiment, the curing agent comprises an average of 1.5 or more amine functional moieties per molecule of curing agent. I a more preferred embodiment, the curing agent comprised an average of 2 amine moieties per molecule of curing agent. In an even more preferred embodiment, the curing agent comprises at least 2.5 amine functional moieties, for example three functional amine moieties, per molecule of curing agent.

A preferred curing compound is a poly(alkyl-ether) diamine, a poly(alkyl-ether)triamine, or a mixture thereof, where the carbon atoms binding to the nitrogen are separated by at least one alkyl-ether segment. One such curing agent comprises a poly(oxyalkylene) di- or tri-amine, for example a poly(oxypropylene) di- or tri-amine. The alkylene moieties can be the same or different, and include ethylene, propylene, 1-butene, and the like. Having at least a portion of the curing agent comprise a tri-amine provides a thermosetting fixative. While the curing agent may react with the adhesive prior to pressure-laminating the thermoplastic to the fabric, it is preferred that at least a portion of the curing agent react with at least a portion of the adhesive during the pressure lamination step. A preferred curing agent molecular weight is between about 100 and about 4000, for example between about 150 and about 1000, say between about 200 and about 500. Such a compound would have between about 3 and about 10 poly(oxypropylene) moieties.

Without being bound to theory, it is believed the curing agent promotes adhesive curing and beneficially also promotes adhesion to the fabric. The reaction takes place at a time and rate sufficient to result in substantial curing of the adhesive contacting the fabric, thereby limiting adhesive penetration during the adhesive during pressure lamination.

The polymeric film is adhesively bonded to the fabric. The pre-formed film may be a thermoplastic film. In one embodiment the film is a rubber, for example a fire resistant chloroprene rubber. Examples of such films include films comprising a homopolymer, copolymer or block copolymer of a polyolefin, copoly(ether-ester), copoly(ester-ester), polyester, thermoplastic polyester, copoly(ether-amide), copoly(ester-amide), polyamide, polyimide, polyether, copoly(ether-urethane), copoly(ester-urethane), polyurethane, thermoplastic polyurethane, polyacrylate, polyacrylonitrile, polystyrene, poly(alkylacrylates), polysulfone, vulcanized thermoplastic elastomers, natural poly(isoprene), synthetic poly(isoprene), butyl rubber, styrene-butadiene elastomers, epichlorohydrin rubber, phenolic resin, ionomer resin, fluoropolymers, ethylene-propylene-diene rubber, nitrile rubber, polysulfide rubber, and blends thereof. Also included are films made of or comprising polyethylene, polypropylene, poly(acrylonitrile-butadiene), poly(vinyl alcohol), poly(vinyl acetate), chlorotrifluoroethylene copolymer rubber, poly(vinylidene fluoride), vinylidene fluoride-hexafluoropropylene copolymer rubber, poly(chloroprene), poly(methyl methacrylate), poly(butadiene), styrene-butadiene-styrene block copolymer, styrene-(hydrogenated butadiene)-styrene block copolymer, or a blend thereof.

The thickness of the thermoplastic is typically less than 2 mils, preferably less than about 1 mil, and more preferably less than about 0.5 mil.

The polymeric film is bonded to the fabric at least partially by means of an adhesive. As used herein, the term "adhesive" is intended to include a joining compound, as well as a coating or other use to which the claimed compositions have utility. Soft polymeric adhesive binders or resins are used as adhesive agents. The adhesive in one embodiment includes an adhesive gum. One adhesive includes a carboxylated butadiene acrylonitrile, though many other adhesive gums are know. In one embodiment the adhesive is a thermosetting adhesive. The adhesive gum may contain a small amount of cross linking agents.

One preferred adhesive is polyurethanes. Polyurethanes, which are formed by the reaction of the hydroxyl groups of a polyol with a curing agent such as an organic isocyanate compound, provide excellent bonding or joining properties when cured, thus forming strong adhesives. By utilizing an isocyanate terminated prepolymer technique, it is possible to obtain moisture curable formulations which provide similar adhesive properties. High green strength polyurethanes, such as those described in U.S. Pat. Nos. 4,889,915 and 5,036,143, the disclosures of which are incorporated herein by reference, are suitable for use in the instant application. High green strength adhesives tend to prevent wrinkling and slippage of films during lamination. In panel assembly and packaging, faster handling and wrapping rates can be achieved with such high green strength adhesives. When adhesives are applied to a vertical surface, a sufficiently high green strength allows the adhesive to prevent a mechanically unsupported, bonded member from slipping under the influence of gravity. The adhesive may include thinning solvents, which may but need not necessarily be removed prior to laminating.

The alkyl ether amine, used to pre-treat the fabric, advantageously comprises about 3 to 10% alkyl ether amine solution in a solvent or other carrier, for example water. The fabric is exposed to the curing agent, for example by coating or dipping the fabric in a solution of about 5% alkyl ether amine solution in water. Excess alkyl ether amine is initially removed from the fabric by passing the fabric between rollers. The alkyl ether amine coated fabric may then be dried at ambient conditions, but commercial process dictate drying in an oven at an oven temperature of from about 100° C. to 190° C., more preferably from about 130° C. to 190° C., and most preferably about 160° C.

Without being bound to theory, in the case of poly(alkyl-ether) di- and tri-amines, the curing agent may form covalent bonds with some of the substrate, and may additionally provide amine functional group to encourage crosslinking with the adhesive. An excellent bond between the adhesive and the fabric may therefore be obtained without use of excess adhesive. Excess adhesive, which wicks or is forced into the fabric during pressure laminating, results in an undesirably stiff and heavy coated fabric product.

The adhesive is preferably a moisture cure urethane adhesive that is applied to the dried amine-coated fabric using a knife edge or blade, die, or applicator roll. Heated adhesive can be applied as 100% solid, i.e., no solvent. The current invention allows adequate adhesion to the fabric with a small loading of adhesive. The adhesive is applied to a weight of from about 0.4 to 3 oz/yard$^2$ when dry, preferably from 0.6 to 2 oz/yard$^2$ when dry, and more preferably to a weight of less than about 1.0 oz/yard$^2$ when dry. The adhesive coated fabric is dried in an at an oven temperature of between about 30° C. and about 140° C., preferably between about 50° C. and about 80° C., for example about 65° C., in order to remove any solvent present in the adhesive.

It is believed that the curing agent and the adhesive at least partially react during this drying phase. Accordingly, the coated composite fabric of the invention comprises a fabric substrate, an adhesive, and a thermoplastic or thermoset layer pressure-laminated thereon, wherein the adhesive is at least partially cross linked prior to pressure laminating so the adhesive penetration into the fiber is reduced.

The film, for example a thermoplastic film such as a polyether film, a polyether urethane film, or a copolymer nylon (polyamide) film, and is then pressure laminated to the adhesive using a nip roller.

The softener, also called an antiblocking agent, for example a silicone polyurethane copolymer or a acrylic polymer, i.e., an acrylic polymer in an MEK carrier such as is commercially available from PAN Technology Inc. of Carlstadt N.J. as product FV58-1681 (™), may optionally be applied to the thermoplastic with a gravure roller, preferably to a loading of from about 0.05 to 2 oz/yard$^2$, more preferably to a loading of from about 0.2 to about 1.2 oz/yard$^2$, for example about 1.0 oz/yard$^2$. The softener may also be applied to the fabric side, in addition to or alternatively to applying the softener to the film side. The acrylic polymer sticks to the film, and forms a layer that does not stick to itself. The solvent, i.e. MEK, toluene, or the like, is flashed off quickly but helps adhere the acrylic polymer or silicon containing urethane copolymer to the film. The nylon film does not need unblocking agents. Urethane films or other thermoplastics advantageously have anti-blocking agents.

A further embodiment of the invention describes a process for manufacturing a coated fibrous fabric comprising the steps of: coating a fabric with a compound that increases viscosity of an adhesive; applying an adhesive to the coated fabric; and pressure laminating a thermoplastic layer to the adhesive-coated fabric, wherein the compound reduces penetration of the adhesive into the fabric compared with a coated fabric manufactured without the compound. The compound preferably adheres to the fibers and thereby substantially prevents the adhesive from physically entering the fabric. In a preferred embodiment, the compound increases the viscosity of the adhesive thereby substantially preventing the adhesive from entering the fabric. In a still further embodiment, the compound is a cross linking agent, which cross links the adhesive and substantially prevents the adhesive from entering the fabric.

It is believed that precoating the fabric with the curing agent places the curing agent is the position to best promote the adherence of the adhesive to the fabric and to prevent wicking of the adhesive into the fabric, while at the same time not impairing adhesion of the adhesive to the polymeric film.

In one embodiment, the pretreatment compound may additionally contain materials to activate the surface of the fabric to make it receptive to a polymer coating, for example aziridine, which reacts with the NH group of nylon.

In one embodiment the present invention provides a plain woven fabric made from for example a thermoplastic material such as nylon (a high temperature thermoplastic cast film) or polyester. The fabric is treated with a pretreatment compound that comprises polyoxyethylene triamine. The fabric is coated with a layer of thermoplastic adhesive material at 0.5 to 2 oz. per square yard. The coating is applied by spread coating, primarily on the surface. This creates higher adhesion to the substrate, see U.S. Pat. No. 5,298,303, the disclosure of which is incorporated by reference. Advantageously, about 0.5 to 0.6 oz. of a adhesive coating is applied, and the coated fabric is dried in an oven to remove solvents. The adhesive coating includes a polyurethane having extra polyol and isocyanate so that it has extra OH groups. Then about 0.4 to 0.5 oz of a top coat is applied and again the fabric is dried in an oven. The topcoat includes thermoplastic polyurethane with any extra isocyanate. If the polyurethane contained extra isocyanate, then cross-linking would occur and the coating would become thermosetting. Alternatively, a dip tank could be used to apply any of the coatings.

According to a preferred embodiment of the invention, the composite fabric additionally comprises a coating which prevents the thermoplastic film from sticking to itself. This may be a polymerizable or non-polymerizable silicone oil, an organopolysiloxane, or the like. Silicone oils and organopolysiloxanes also provide softer feel and increase abrasion, chemical, and stain resistance.

Nonfunctional and functional siloxanes as characterized above may be monomeric, (low molecular weight), or oligomeric or polymeric (high molecular weight) and either linear, branched or cyclic. Examples of polymeric siloxane compounds include nonfunctional and organofunctional polysiloxanes including dimethylpolysiloxanes, poly(urethane siloxanes), methylhydrogen polysiloxanes, methylalkyl polysiloxanes methylaryl polysiloxanes, methylfluoroalkyl polysiloxanes, and organofunctional methylpolysiloxanes such as aminoalkylmethyl polysiloxane, cyanoalkylmethyl polysiloxane, haloalkylmethyl polysiloxane, and vinylmethyl polysiloxane. Examples of monomeric or oligomeric siloxanes include: Me—OSi(Me)$_2$—OMe, Me$_3$SiOMe, Me$_3$Si(OMe)$_2$, Si(OMe)$_4$, Si(OEt)$_4$, MeSi(Me)$_2$—OSi(Me)$_2$—Me, HOOC—(CH$_2$)$_3$—Si(Me)$_2$—O—Si(Me)$_2$—(CH$_2$)$_3$—COOH. Examples of cyclic siloxane oligomers include octamethylcyclotetrasiloxane and decamethylcyclopentasiloxane.

The preferred silicon compound emulsion is a silicone polyurethane copolymer DAI-ALLOMER SP-203 (™); another modified organopolysiloxane is APS V-SOFT (™), both available from Advanced Polymer, Inc. of Saddlebrook, N.Y.

Compatible adjuvants can be added to the compositions, i.e., to the fabric, to the viscosifier compound, the adhesive, and/or the pre-formed film, for their known purposes. Such adjuvants include, but are not limited to, viscosity control agents, perfumes, emulsifiers, preservatives, UV light absorbers, antioxidants, bactericides, fungicides, colorants, dyes, fluorescent dyes, brighteners, opacifiers, soil release agents, and shrinkage control agents. In addition, an antioxidant, antiozonant or other stabilizer can be added to the fabric to increase its resistance to aging, high temperature induced degradation or discoloration.

FIG. 1 shows a cross-sectional view of the fabric of the present invention. The composite fabric 1 comprises a fabric substrate 2 and a plurality of coated layers provided thereon. The combination of substrate and subsequent coatings is chosen to impart desired properties in the final composite. The composite further comprises an adhesive layer 4, which is used to bond the fabric substrate with a preformed thermoplastic film 6.

Figure 2:
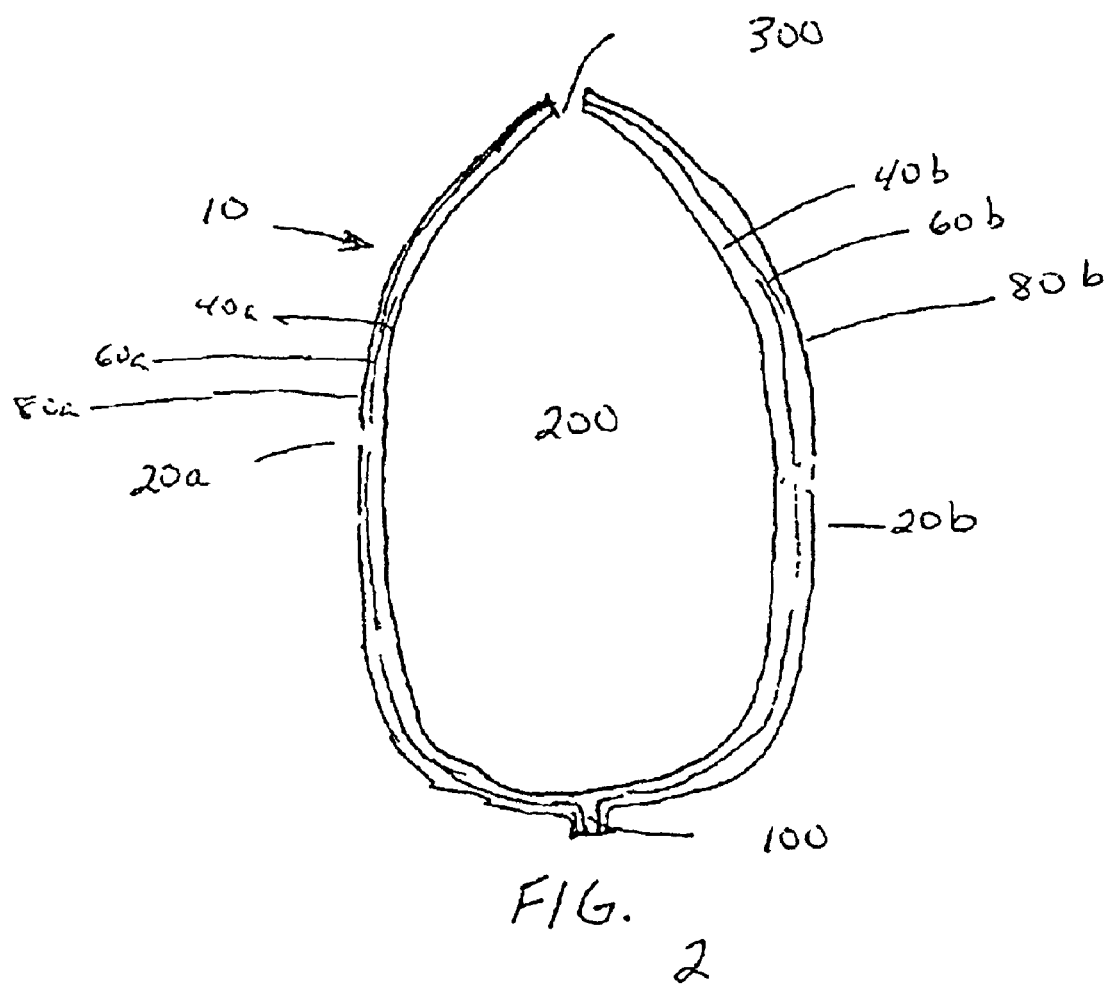
FIG. 2 shows a cross section view of an automobile airbag manufactured from the composite fabric of the present invention.

FIG. 2 shows a partial cross section of an automobile airbag manufactured from the composite fabric of the present invention. The air bag 10 comprises two opposing panels 20a and 20b of a fabric substrate, which are woven together along a seam 100 along circumferential edges in order to form an interior portion 200 that accommodates an expanded gas. The seam is interrupted in order to create an opening 300 for attaching a means of supplying an expanding gas to the interior portion 200. Additional non-circumferential seams (not shown) may be woven into the fabric in order to isolate regions that are not designed to expand when an expanding gas is supplied to the interior. The fabric panels 20a and 20b are preferably woven together to form the skeleton of air bag 10 prior to formation of the composite fabric thereon. Furthermore, with respect to each fabric panel 20a and 20b, the formation of the composite fabric thereon maybe accomplished serially, i.e. by forming the composite fabric first on one panel, turning the airbag 10 over, and repeating the process on the second panel or, more preferably, in parallel, i.e. forming the composite fabric on the two opposing panels simultaneously.

The fabric panels 20a and 20b are treated with a compound that increases the viscosity of an adhesive thereby substantially preventing the adhesive from entering the fabric. The compound, preferably ether alkyl amine, is applied to the fabric and then dried before adhesive layers 40a and 40b are applied. The adhesive is preferably a moisture cure urethane adhesive. After the adhesive layers are applied and dried, thermoplastic layers 60a and 60b are pressure laminated, preferably using a nip roller, to the adhesive-coated, amine pre-treated fabric. The composite air bag of the invention is completed by applying release coatings 80a and 80b, most preferably a silicone polyurethane co-polymer cross-linked with a blocked isocyanate, to the exterior of the air bag. The silicone/urethane layer or acrylic layer is preferably applied with a gravure roller and then dried.

The manufacture of the composite fabric of the invention is described in more detail below. The core fabric is initially rolled onto a wooden shell, or other support, from which it is allowed to unwind. As much as 500 yards or more of starting fabric is contained on an individual roll. The fabric is let off from its initial roller and drawn through the manufacture process by an analogous pick-up roller. The rate at which the fabric passes through the process is 1–100 yards/minute, more preferably 20–30 yards/minute, and most preferably 25 yards/minute. The pick-up roller is provided with a motor to maintain the fabric's rate of travel through the process.

As the fabric is unwound from the support, it is initially fed into an accumulator or J-box. This device delays the movement of the fabric on to the first unit process of manufacture and allows additional fabric to be attached to the process train without disrupting the continuity of the process. Therefore, this device facilitates an uninterrupted, economically efficient, manufacturing process.

In a first unit process, the fabric is saturated with a water or solvent diluted ethyl alkyl amine solution. The fabric is passed though the accumulator and through a tank containing a solution of alkyl ether amine wherein the entire surface of the fabric is coated. The concentration of the ethyl alkyl amine in the tank is about 3–100%, preferably about 3–10%, and most preferably about 5% solution in water. The most preferable amine is Jeffamine T-403 from Huntsman Petrochemical, though other amines may be suitable. Upon exiting the tank, the fabric is drawn between rollers that remove excess solution from the fabric. In one embodiment an acceptable loading ranges from 0.1 to 1 ounces of curing agent composition, which contains about 5% curing agent, per yard of fabric. The coated fabric is then dried by passing it through a drying oven. The temperature of the drying oven is preferably at least about 100° C., more preferably at least about 130° C., and most preferably about 160° C. While the minimum oven temperature, in order to affect efficient drying, is preferably above the boiling point of water, the maximum oven temperature is preferably below the degradation temperature of the fabric. For nylon-based fabrics the oven is preferably set to a maximum temperature of about 160° C. A maximum temperature as high as about 190° C. may be used for polyester-based fabrics. It is preferred that at least 90%, preferably at least 99%, of the solvents and carriers, for example water, are removed during the drying process.

In a second unit process, after it is dried, the amine-pretreated fabric is coated with an adhesive. The adhesive is applied to a surface of the fabric using a blade or knife edge, gravure-type roll, reverse roll coater, or screen coater. A predetermined gap between the knife edge and the fabric controls the amount of adhesive applied to the fabric surface. The adhesive is applied to the fabric to generate a film that is between about 0.6 to 2.0 oz/yard$^2$ when dry, and more preferably about 1.0 oz/yard$^2$ when dry. The adhesive is most preferably a moisture cure urethane adhesive such as UPACO-245 from Worthen Industries. Following the application of the adhesive, the fabric is again passed through an oven where the solvents from the adhesive are flash evaporated. Exposing the adhesive to steam or mist after the solvent is substantially removed escalates curing of the adhesive. The temperature of the drying oven is preferably about 65° C.

During the adhesive-coating step, the amine advantageously reacts with the adhesive, which prevents the adhesive from soaking into the fabric. In the absence of the amine pre-treatment, the adhesive would permeate the fabric and impart to it an undesirable stiffness. Without wishing to be bound by theory, the amine-adhesive interaction results in the cross-polymerization of the adhesive. The increased viscosity of the adhesive precludes it wetting and penetrating the fabric. Thus, the amine pre-treatment serves as a barrier to unwanted diffusion or infiltration of the adhesive into the fabric.

In a third unit process, a thin thermoplastic film is pressure laminated to the adhesive surface. The film to be laminated is suspended above the adhesive-coated fabric. As the fabric passes underneath, the thermoplastic is dropped onto the tacky surface. The composite structure is passed through a nip roller, which applies uniform pressure in order to complete the lamination. The adhesive binds the thermoplastic to the fabric to create a laminated composite fabric material. The thermoplastic is preferably less than about 1 mil in thickness and more preferably less than about 0.5 mils thick. The preferred thermoplastic is St-3010-80 polyether from Stevens Urethane.

Optionally, in a fourth unit process step, an additional coating 8 in FIG. 1 is applied to the thermoplastic film in order to prevent the thermoplastic film from sticking to itself, particularly at elevated temperatures. The additional coating, a release coating, is most preferably a silicone polyurethane co-polymer or acrylic, such as Dia-Allomer SP-203 from Advanced Polymer, Inc., cross-linked with a blocked isocyanate. The release coating is applied preferably with a gravure roller but may be applied by other means known to those skilled in the art. A gravure roller is provided with a textured surface that controls the amount of silicone/urethane that is transferred to the laminated film. In a preferred embodiment, the silicone/urethane is applied to the thermoplastic to generate a film that is between about 0.05 to 1 oz/yard$^2$, preferably about 0.05 to 0.2 oz/yard$^2$ when dry, and more preferably about 0.1 oz/yard$^2$ when dry. In another preferred embodiment, the acrylic is applied to the thermoplastic to generate a film that is between about 0.05 to 1 oz/yard$^2$, preferably about 0.05 to 0.2 oz/yard$^2$ when dry, and more preferably about 0.1 oz/yard$^2$ when dry. Following the application of the release coating, the fabric is again passed through an oven where the solvents from the release coating are evaporated. The temperature of the drying oven is preferably about 65° C. In a final step, the completed composite fabric is wound onto a wooden shell or other support.

After the composite fabric is manufactured, it may be assembled into the final product, such as an airbag. Alternatively, and more preferably, the fabric is preassembled into a desired form, such as an air bag, and then processed to form a composite fabric. Furthermore, the process described is preferably continuous, in that an entire roll of fabric is processed through each unit step without disruption. The fabric may be processed one side at a time, or the process may be configured to form the composite layer on both sides of the fabric simultaneously.

There are several advantageous associated with the fabric of the invention. An airbag manufactured from the fabric will remain at least partially inflated and protect the occupant from injury during a side impact or rollover incident. The method of the invention advantageously eliminates the need for sewn seams, which show a propensity to fail during deployment. Furthermore, sewn seams are an expensive unit process and their elimination thus reduces labor and manufacturing expenses. The present invention also enables the manufacture of the form or shape of the restraint device in a single sealing operation, permitting the use of thin lightweight thermoplastic coated materials instead of thick, heavy coated fabrics such as silicone.

While the invention has been illustratively described herein with reference to specific aspects, features and embodiments, it will be appreciated that the utility and scope of the invention is not thus limited and that the invention may readily embrace other and differing variations, modifications and other embodiments. The invention therefore is intended to be broadly interpreted and construed, as comprehending all such variations, modifications and alternative embodiments, within the spirit and scope of the ensuing claims.

What is claimed is:

1. A process for manufacturing a coated fibrous fabric comprising: coating a fabric with a curing compound that increases viscosity of an adhesive; applying an adhesive to the coated fabric; and pressure laminating a thermoplastic film to the adhesive-coated fabric, wherein the curing compound comprises at least two amine moieties per molecule of curing agent, and reduces penetration of the adhesive into the fabric compared with a coated fabric manufactured without the curing compound.

2. The process of claim 1 wherein the compound adheres to the fibers and thereby substantially prevents the adhesive from physically entering the fabric.

3. The process of claim 1 wherein the curing compound increases the viscosity of the adhesive contacting the fabric and thereby substantially preventing the adhesive from entering the fabric.

4. The process of claim 1 wherein the compound is a cross linking agent, which cross links the adhesive contacting the fabric and thereby substantially prevents the adhesive from entering the fabric.

5. The process of claim 3 wherein the coated fibrous fabric further comprises a silicone- or acrylicic-containing compound or mixture thereof applied to the film in an amount sufficient to ensure no sticking or blocking under heat and pressure of the coated fibrous fabric.

* * * * *